Nov. 8, 1955 H. P. KEIL 2,722,886
ROLLER MOVING MEANS FOR ROTARY DUPLICATING MACHINE
Filed March 29, 1952 5 Sheets-Sheet 1

INVENTOR.
Henry P. Keil
BY Greek Wells
Atty.

Nov. 8, 1955  H. P. KEIL  2,722,886
ROLLER MOVING MEANS FOR ROTARY DUPLICATING MACHINE
Filed March 29, 1952  5 Sheets-Sheet 4

INVENTOR.
Henry P. Keil
BY
Greek Wells
Atty.

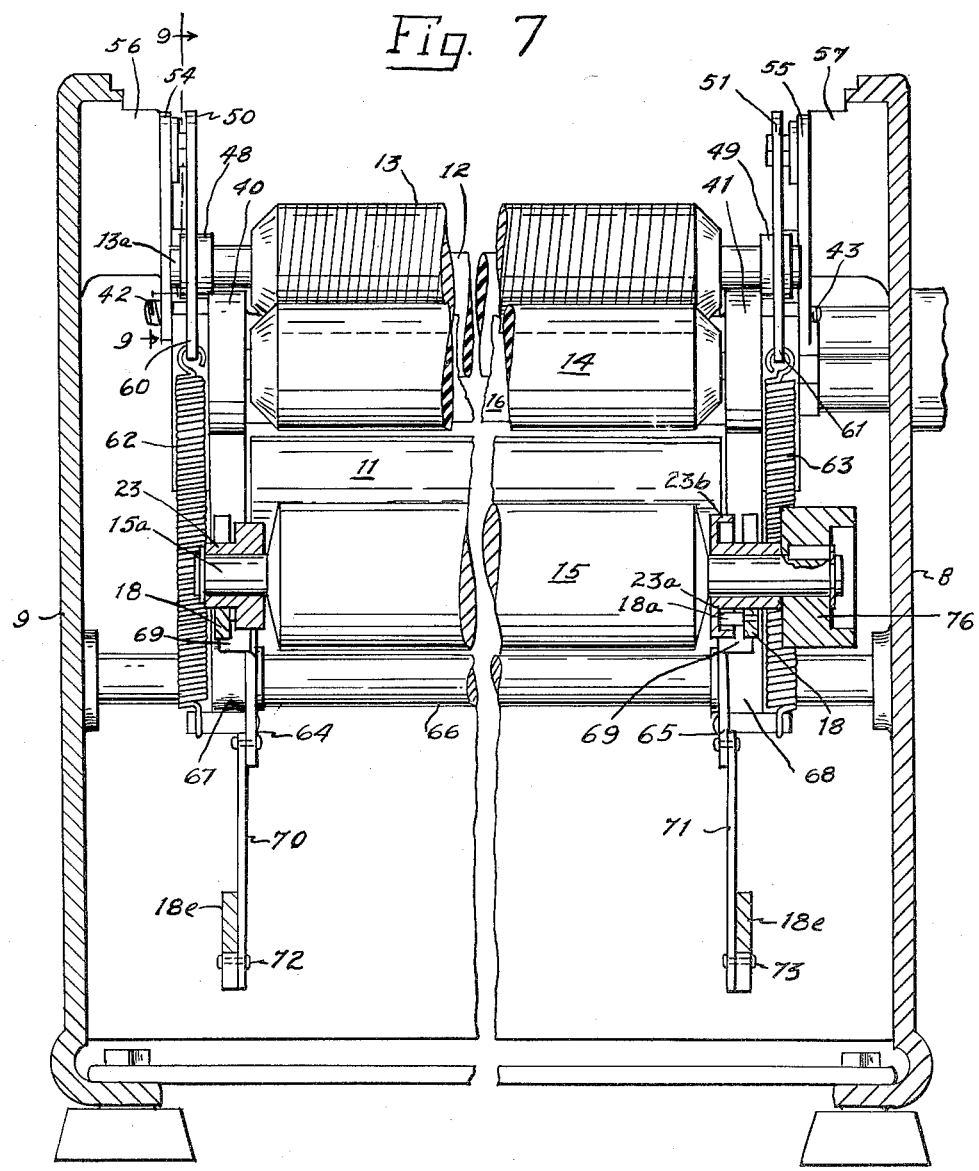

United States Patent Office 2,722,886
Patented Nov. 8, 1955

2,722,886

ROLLER MOVING MEANS FOR ROTARY DUPLICATING MACHINE

Henry P. Keil, Chicago, Ill., assignor to The Fixture Hardware Corporation, Chicago, Ill., a corporation of Illinois Application March 29, 1952, Serial No. 279,287

13 Claims. (Cl. 101—132.5)

The present invention relates to improvements in a duplicating machine of the type shown in my prior applications, Serial No. 726,502, filed February 5, 1947 for Duplicating Apparatus, now Patent No. 2,594,179 and Serial No. 791,881, filed December 15, 1947, for Motor Driven Duplicating Machine, now Patent No. 2,622,519. It is the purpose of the present invention to provide a machine of this character where the pressure roller is movable out of pressure relation to the master sheet drum when not in use, with a novel mechanism interconnecting the pressure roller supporting arms with the moistening roller assembly whereby the mechanism operates to relieve the normal operating pressure between the rollers of the assembly whenever the pressure roller is moved away from the drum and operates to apply operating pressure between the rollers of the assembly whenever the pressure roller is moved into pressure relation with the drum.

It is also a purpose of this invention to provide in combination with the pressure roller to moistening roller assembly drive mechanism and the drum, a means for adjusting the margin that will be provided at the head of the copy sheet when it is fed into contact with a master sheet on the drum.

Other and more detailed objects and advantages of the invention will appear from the following description and the accompanying drawings wherein a preferred form of the invention is shown. It should be understood however, that the drawings and description are illustrative only and are not intended to limit the invention except insofar as it is limited by the claims.

In the drawings:

Figure 7 is a sectional view taken on the line 7—7 of Figure 2;

Figure 8 is a sectional view taken on the line 8—8 of Figure 2; and

Figure 9 is a sectional view taken on the line 9—9 of Figure 7.

Figure 1:
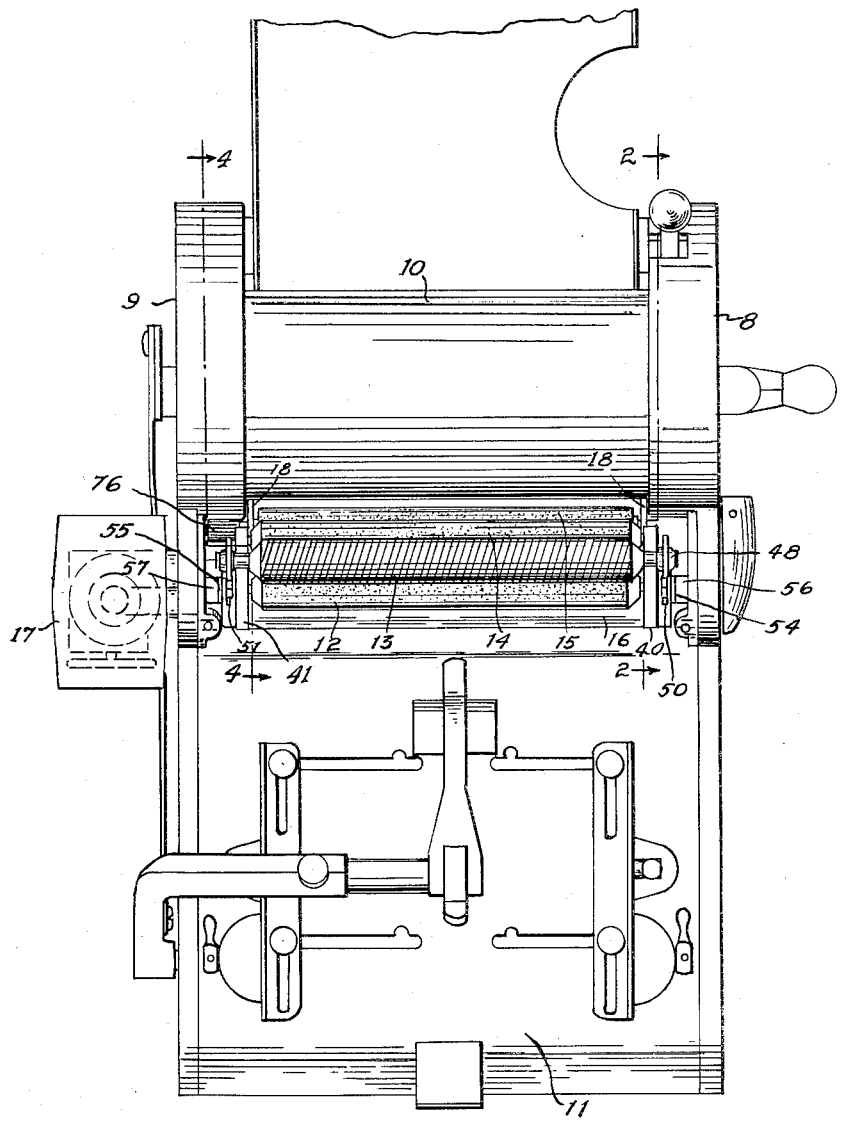
Figure 1 is a plan view of a duplicating machine embodying my invention.

My invention is embodied in a machine for making duplicating copies from a master sheet which is printed in reverse with a suitable hectograph ink. This master sheet is secured on a drum 10 by a master sheet gripping mechanism such as that shown in my prior applications, Serial No. 791,881 and Serial No. 726,502. The copy sheets to be duplicated are fed into the drum 10 from a feed tray 11 through a moistening roller assembly which comprises a fountain roller 12, a transfer roller 13, a moistening roller 14 and a roller 15 which cooperate with the moistening roller to advance the sheets. The roller 12 runs in a body of liquid in a fountain 16 which receives its supply of liquid solvent from a container 17.

The roller 15 is carried on a lever 18 which also carries a pressure roller 19 which is adapted to press copy sheets that are fed between the rollers 14 and 15, against the master sheet on the drum 10. There are two of the levers 18 which are substantially alike in construction, one at each end of the drum. These levers are pivoted on the side frames 8 and 9 of the machine by pivot members 20. The shaft 19a of the pressure roller has a bearing 21 which rests in a depression 22 of the lever 18. In a like manner the roller 15 has bearings 23 and 23a on its shaft 15a, the bearings being seated in depressions 24 which are formed in the top surfaces of the levers 18. The bearing 23a has a flange 23b which fits over a pin 18a on the corresponding lever 18. The pressure roller 19 and the roller 15 can be easily removed when the lever 18 is in the position shown in Figure 2 by lifting the bearings 21 and 23 out of the depressions 22 and 24.

Figure 2:
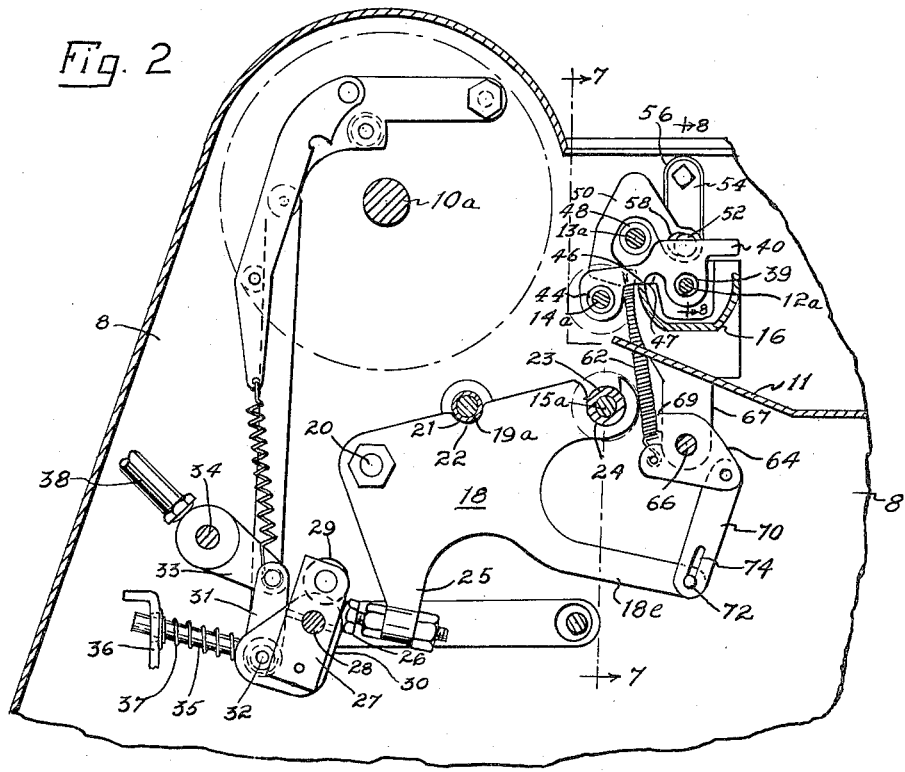
Figure 2 is an enlarged fragmentary sectional view taken substantially on the line 2—2 of Figure 1, showing the mechanism by which the platen roller and the associated moistening roller assembly are interconnected with the drum and master sheet control mechanism of my prior application, Serial No. 791,881.
Figure 3:
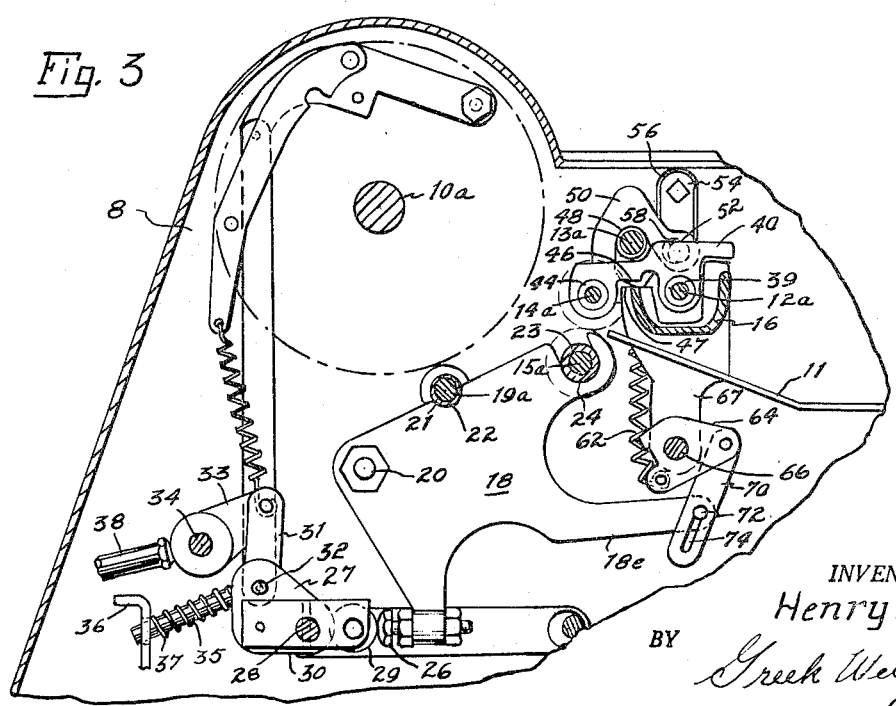
Figure 3 is a view like Figure 2 with the parts shown in a changed position.

The levers 18 are moved between the two limiting positions shown in Figures 2 and 3 by the mechanism illustrated in these figures. This mechanism comprises a depending portion 25 on the edge of each lever 18 which is provided with an adjustable stop member 26. Trip levers 27 are fixed on a shaft 28 that is adjustably mounted in the side frames 8 and 9 so as to have a limited amount of movement in a horizontal direction. The trip levers have rollers 29 and cam surfaces 30 for engaging the stops 26. A link 31 is pivoted to one of the trip levers 27 by a pivot pin 32. This link has its upper end pivoted to an arm 33 on a cross rod 34. The cross rod 34 is fixed in the side frames 8 and 9 and the arm 33 is provided at only one side of the machine adjacent to the side frame 8. The pivot pin 32 also mounts a toggle rod 35, the free end of which extends through a bracket 36 on the side frame 8. A spring 37 is under compression on the rod 35 between the bracket 36 and the head of the rod 35 which is pivoted on the pivot pin 32.

The arm 33 has a handle 38 secured thereto for turning it to move the trip lever 27 between the two positions shown in Figures 2 and 3.

In duplicating machines using a solvent liquid which is spread by a series of rollers such as 12, 13 and 14, upon the copy sheets, it has always been difficult to keep the rollers from developing flat spots or imperfections in the surfaces when the machines are left standing. The pressure on the rollers necessary for them to function properly is great enough to cause permanent flattening if the pressure is not relieved when the machines are idle for any substantial period of time. The mechanism heretofore described permits separation of the pressure roller 19 and the roller 15 from the drum and the moistening roller 14 respectively. In the present invention, I also provide means for relieving the pressure between the rollers 12 and 13 and between the rollers 13 and 14. This is done in such a way as to establish the required pressure between the rollers 12, 13, 14 and 15 when the machine is operating and in such a way as to permit the rollers to be readily removed for cleaning and replacement.

The roller 12 has bearings 39 on the ends of its shaft 12a. These bearings are removably seated in brackets 40 and 41 which are pivoted on pivot pins 42 and 43 in the ends of the fountain 16. The bracket 40 is slotted downwardly from the pivot pin 42 so that it can be lifted off. The brackets 40 and 41 extend toward the drum over the adjacent edge of the fountain 16 and have bearings 44 and 45 for the shaft 14a of the roller 14. Each of the brackets 40—41 has a portion 46 which is adapted to rest on a flat surface 47 that is provided on the fountain 16. When the levers 18 are moved down to the position shown in Figure 2, the parts 46 and 47 limit the extent of downward movement of the bracket and the roller 14. When the lever 18 is moved up to the position shown in Figure 3, the roller 14 is engaged by the roller 15 and lifted to separate the parts 46 and 47.

The roller 13 has bearings 48 and 49 rotatably but non-slidably mounted on the ends of its shaft 13a. The roller 13 preferably is a metal roller having its surface provided with a fine spiral groove for the purpose of distributing the solvent received by it from the roller 12 and delivered by it to the roller 14. The roller 13 rests loosely on the rollers 12 and 14 when the parts are in the position illustrated in Figure 2. The roller is entirely free of any pressure other than its own weight and the small amount of weight of the bearings for brackets 50 and 51. These brackets seat over the bearings 48 and 49 to keep the roller 13 from being completely displaced. The brackets 50 and 51 are mounted on supporting pins 52 and 53 that are carried on bars 54 and 55. The bars 54 and 55 have their upper ends secured to lugs 56 and 57 on the side frames of the machine and their lower ends are secured to the ends of the fountain 16. The brackets 50 and 51 have elongated apertures 58 and 59 receiving the pins 52 and 53 so that there is a limited amount of permissible movement of the brackets to enable the roller 13 to seat properly on the rollers 12 and 14.

In order to supply operating pressure between the rollers 12, 13 and 14, the brackets 40 and 41 extend downwardly outside the brackets 40 and 41 and are provided with portions 60 and 61 which are located substantially directly beneath the axis of the roller 13 when the roller is in operative position. Springs 62 and 63 are connected to the portions 60 and 61 and extend downwardly. The lower ends of the springs 62 and 63 are connected to levers 64 and 65 which are pivoted on a cross tie rod 66 which also supports depending arms 67 and 68 at the ends of the fountain 16. Each of the levers 64 and 65 has a lug 69 thereon adapted to engage the corresponding arm 67 or 68 and serves as a limit to the movement of the lever 64 or 65 in one direction about the tie rod 66. In this limited position of the levers 64 and 65 the springs 62 and 63 are devoid of tension when the brackets 40 and 41 are in their lowermost position with the parts 46 and 47 in engagement.

When the levers 18 are raised to the position shown in Figure 3, the rollers 14 and 15 are engaged to lift the brackets 40 and 41 slightly. This movement however, is not adequate to tension the springs 62 and 63 enough to obtain proper bearing pressure between the several rollers 12, 13, 14 and 15 for feeding copy sheets and for feeding solvent to them. In order to so tension the springs 62 and 63 as to supply the necessary pressure between the rollers, the levers 18 are coupled to the levers 64 and 65 by extensions 18e on the levers 18 and links 70 and 71, the upper ends of which are pivoted to the levers 64 and 65. The extensions 18e are connected to the links 70 and 71 by pins 72 and 73 and slots 74 and 75 so as to provide for a certain amount of lost motion. When the levers 18 are raised from the position shown in Figure 2 to that shown in Figure 3, initially the extensions 18e move upwardly without any effect upon the levers 64 and 65 because of the connection provided by the pins 72 and 73 and the slots 74 and 75. As soon as this lost motion is taken up, further elevation of the levers 18 rotates the levers 64 and 65 causing the springs 62 and 63 to be drawn downwardly and below the lower ends of the arms 67 and 68 as illustrated best in Figure 3. This tensions the springs 62 and 63 sufficiently to provide the necessary pressure between the several rollers 12, 13, 14 and 15.

In order to remove the rollers 12, 13, and 14, it is only necessary to lift the roller 13 and slide it endwise in the brackets 50 and 51 far enough to permit one end of the roller 13 to be moved out from beneath the bracket. The brackets 50 and 51 are loose enough when the tension of the springs 62 and 63 is released, to permit the roller 13 to be removed. It is then an easy matter to lift out the bracket 40 and the rollers 12 and 14. The rollers 15 and 19 may of course, be lifted out of their seats 22 and 24 without any difficulty.

Figure 4:
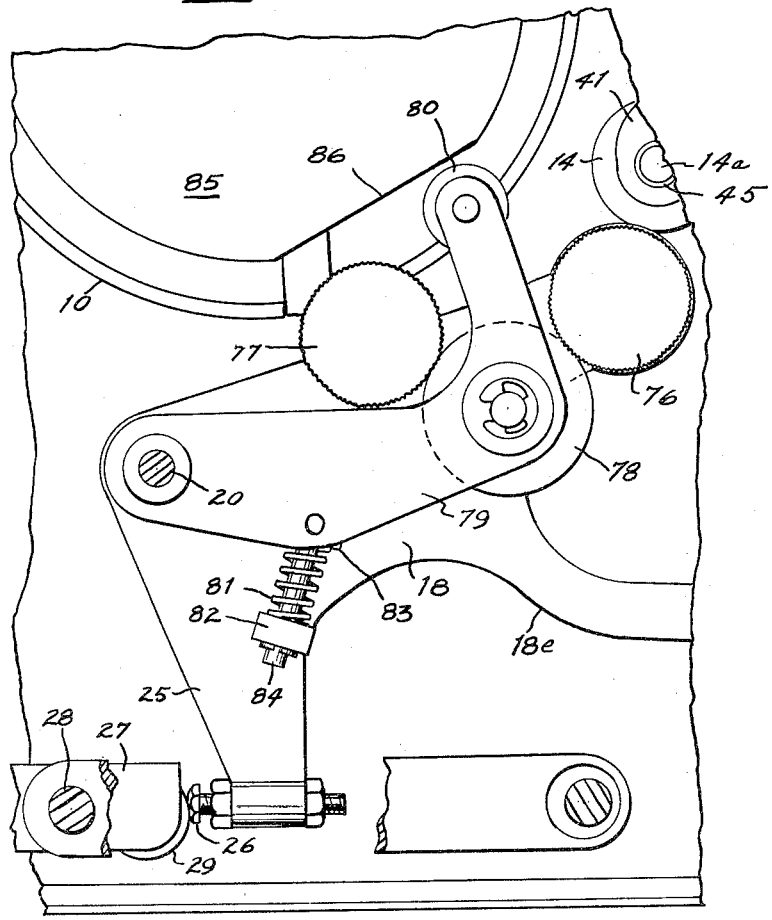
Figure 4 is an enlarged fragmentary sectional view taken on the line 4—4 of Figure 1, showing the mechanism for driving the moistening roller assembly from the platen roller.

The rollers 14 and 15 must be driven a portion of each revolution of the drum 10 in order to advance a copy sheet from the feed tray 11 to the meeting line of the pressure roller 19 with the drum surface. The mechanism by which this is accomplished is illustrated best in Figures 4, 5 and 6 of the drawings. The roller 15 has a knurled head 76 on the shaft thereof beyond the bearing member 23a that fits on one of the levers 18. The roller 19 has a knurled head 77 on its shaft 19a at the corresponding end of the roller 19. The knurled heads 76 and 77 are positioned for engagement with a resilient roller 78 which is journalled on an arm 79 that is pivoted on the same pivot 20 as the corresponding lever 18. The roller 78 is constructed of a tough resilient material such as one of the synthetic rubbers and is journalled for rotation on the arm 79. The arm 79 extends upwardly between the heads 76 and 77 and carries a hard roller 80 at its free end. The roller 78 is urged into engagement with the knurled heads 76 and 77 by a spring 81, one end of which bears against a lug 82 on the downward extension 25 of the lever 18 and the other end of which bears upon a block 83 that is pivoted on the arm 79. A guide pin 84 extends through the lug 82 and the block 83 to keep the spring 81 in position. The arm 79 is composed of two spaced apart members between which the rollers 78 and 80 and the block 83 are positioned.

Figure 5:
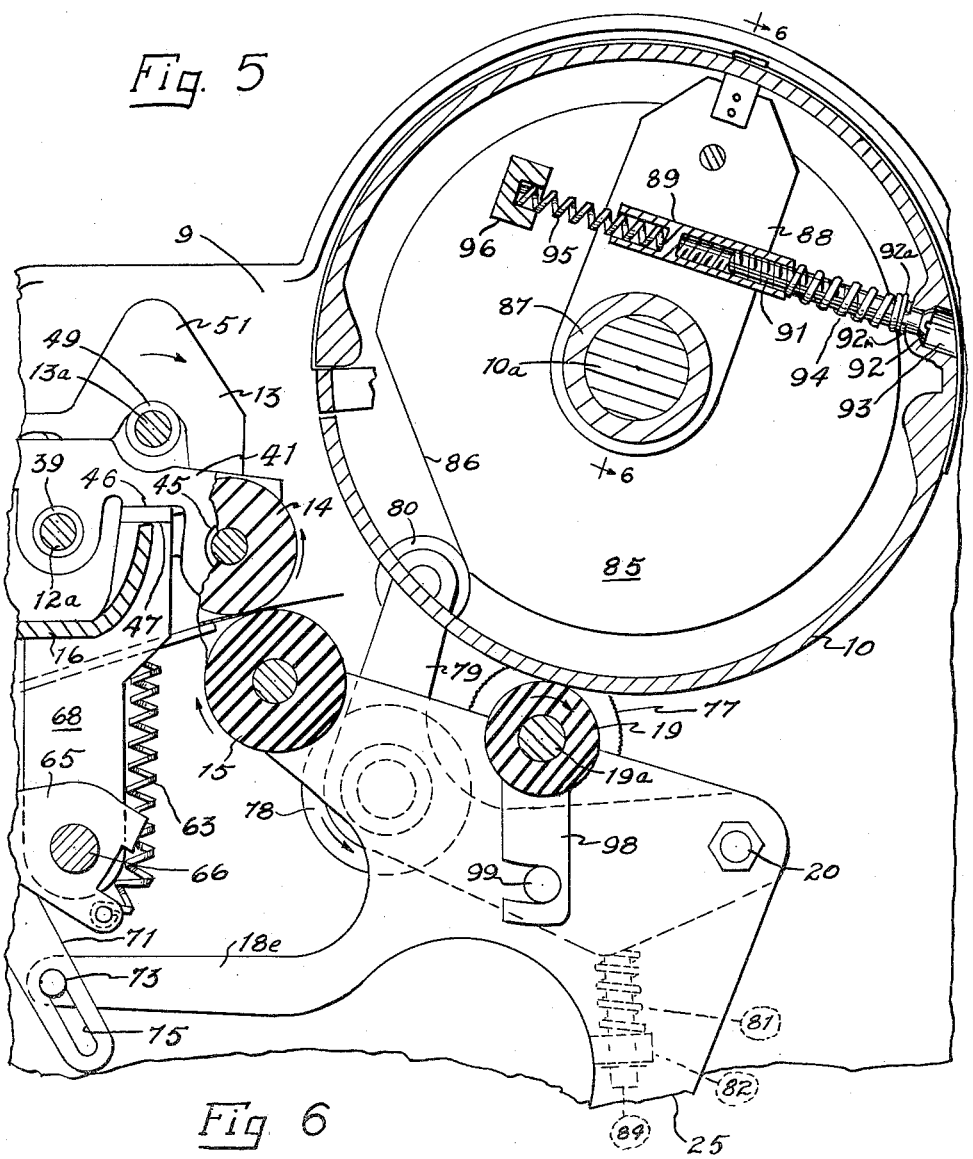
Figure 5 is a view similar to Figure 4, but looking in the opposite direction and showing the machine adjustment mechanism.
Figure 6:
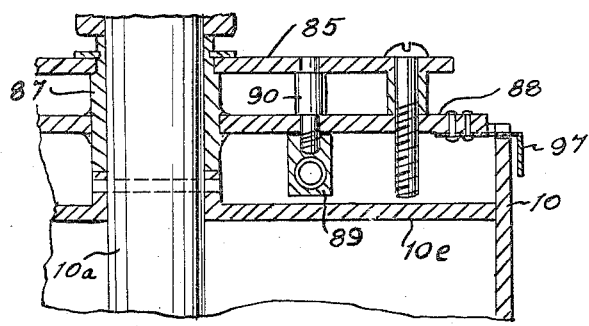
Figure 6 is a sectional view taken on the line 6—6 of Figure 5.

In order to prevent the roller 78 from contacting the knurled heads 76 and 77 except at the time it is necessary to drive the rollers 14 and 15, I provide a cam 85 on the drum 10. This cam is circular throughout most of its circumference and is of sufficient diameter that when it is engaged with the roller 80, it keeps the roller 78 out of engagement with the knurled heads 76 and 77. The cam 85 has a flattened portion 86 on its periphery which permits the roller 78 to engage the knurled heads 76 and 77 for a limited portion of each rotation of the drum 10 sufficient feed a copy sheet from the bight of the rollers 14 and 15 to the meeting line of the drum 10 with the pressure roller 19. Figure 5 of the drawings shows the parts positioned just at the beginning of the engagement of the roller 79 with the knurled heads 76 and 77. The drive of the roller 15 and the moistening roller assembly is from the pressure roller 19. This roller is of course, rotated by its contact with the drum 10. When the pressure roller 19 is turned in the direction indicated by the arrows in Figure 5, it causes the roller 15 to turn in the direction indicated on Figure 5, and this in turn imparts rotation to the several rollers 12, 13 and 14 as indicated. The roller 12 carries solvent from the fountain 16 to the transfer roller 13 which in turn distributes the solvent on the surface of the moistening roller 14 so that this roller spreads the solvent over the surface of the copy sheet being fed between the rollers 14 and 15. The relative sizes of the rollers 15 and 19 and their knurled heads 77 and 76 respectively is such that the rollers 14 and 15 advance a copy sheet somewhat faster than the surface speed of the drum 10. Therefore it is evident that during the time the roller 78 is in driving engagements with the heads 76 and 77, the copy sheet will be advanced far enough to engage between the pressure roller 19 and the drum.

In order to adjust the time of feeding the copy sheet to the drum in relation to the advance of a master sheet on the drum, I provide means for adjusting the cam 85 with respect to the drum. This adjusting means is so arranged as to be readily accessible from the face of the drum. The cam 85 is rotatably mounted on the drum by a sleeve 87 which fits around the drum shaft 10a. A plate 88 is secured to the cam 85 and projects outwardly to the flange of the drum adjacent one end. This plate has a threaded block 89 pivoted thereon by a pivot pin 90. The block 89 receives a screw 91 which has its head 92 seated in a recess 93 in the periphery of the drum. A spring 94 is provided around the screw 91 between one end of the block 89 and the drum periphery. Another spring 95 extends into the bore of the block 89 and rests against a stop lug 96 on the drum end 100. These springs serve to prevent turning of the screw 91 while the machine is running. The head 92 of the screw 91 will keep the arm 88 from moving away from the recessed portion 93 of the drum. A washer 92a and a retaining ring 92 prevents the screw from moving outward. The arm 88 carries a pointer 97 which projects over the edge of the drum for cooperation with suitable markings (not shown) on the surface of the drum for indicating the adjusted position or margin provided. With this construction the arm 88 and the cam 85 can be turned, by adjustment of the screw 91, with respect to the drum through a limited range to vary the margin at the head of the copy sheet.

In order to keep the roller 78 from lifting the roller 19 out of its seat in the lever 18 to which the arm 79 is connected, I provide a latch 98 on the shaft 79a of the roller 19. This latch 98 engages a pin 99 on the lever 18. The pin 18a and the bearing 23a cooperate to prevent the roller 78 from lifting the roller 15 out of its seat.

It is believed that the nature and advantages of my invention will be apparent from the foregoing description.

Having thus described the invention, I claim:

1. In a duplicating machine, a supporting frame, a drum mounted in the frame having means to mount a master sheet, a pressure roller for pressing sheets against the drum, lever means supporting the pressure roller and pivotally supported by the frame to swing the roller into and out of pressure contact with the drum, a liquid trough adjacent to the drum, a roller rotatably supported therein, a copy sheet moistening roller adjacent to the trough, brackets carrying the moistening roller and movably mounted on the trough, a transfer roller resting on the two last named rollers, a copy sheet feeding roller carried by said lever means and movable thereby between a position spaced from the moistening roller when the pressure roller is separated from the drum, and a position where it engages and lifts the moistening roller when the pressure roller engages the drum, confining brackets for the transfer roller movably mounted at the ends of said trough for vertical movement, springs suspended from said brackets, and means connecting the springs with said lever means operable to tension the springs when the lever means is positioned to engage the pressure roller with the drum, and operable to relieve the tension of said springs when the lever means is positioned to separate the pressure roller from the drum.

2. In a duplicating machine, a supporting frame, a drum mounted in the frame having means to mount a master sheet, a pressure roller for pressing sheets against the drum, lever means supporting the pressure roller and pivotally supported by the frame to swing the roller into and out of pressure contact with the drum, a liquid trough adacent to the drum, a roller rotatably supported therein, a copy sheet moistening roller adjacent to the trough, brackets carrying the moistening roller and movably mounted on the trough, a transfer roller resting on the two last named rollers, a copy sheet feeding roller carried by said lever means and movable thereby between a position spaced from the moistening roller when the pressure roller is separated from the drum, and a position where it engages and lifts the moistening roller when the pressure roller engages the drum, confining brackets for the transfer roller movably mounted at the ends of said trough for vertical movement, springs suspended from said brackets, means connecting the springs with said lever means operable to tension the springs when the lever means is positioned to engage the pressure roller with the drum, and operable to relieve the tension of said springs when the lever means is positioned to separate the pressure roller from the drum, driving wheels on the pressure roller and the copy sheet feeding roller, a third wheel carried by said lever means, spring means urging the third wheel into engagemeent with both of said first named wheels, and means on the drum for holding the third wheel away from the other wheels except for a small portion of each rotation of the drum.

3. In a duplicating machine, a supporting frame, a drum mounted in the frame having means to mount a master sheet, a pressure roller for pressing sheets against the drum, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, manually operable lever means supporting the pressure roller and copy sheet feeding roller for movement up and down between a position where the pressure roller engages the drum and the feeding roller engages and carries the moistening roller, and a position where the copy sheet feeding roller is spaced below the moistening roller and the pressure roller is spaced below the drum, and means connecting the brackets to the lever means operable to move the brackets downward when the pressure roller and feeding roller are raised.

4. In a duplicating machine, a supporting frame, a drum mounted in the frame having means to mount a master sheet, a pressure roller for pressing sheets against the drum, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, said transfer roller having bearings rotatably journalled on the ends thereof, and said brackets overlying the bearings, manually operable lever means supporting the pressure roller and copy sheet feeding roller for movement up and down between a position where the pressure roller engages the drum and the feeding roller engages and carries the moistening roller, and a position where the copy sheet feeding roller is spaced below the moistening roller and the pressure roller is spaced below the drum, and means connecting the brackets to the lever means operable to move the brackets downward when the pressure roller and feeding roller are raised.

5. In a duplicating machine, a supporting frame, a drum mounted in the frame having means to mount a master sheet, a pressure roller for pressing sheets against the drum, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, manually operable lever means supporting the pressure roller and copy sheet feeding roller for movement up and down between a position where the pressure roller engages the drum and the feeding roller engages and carries the moistening roller, and a position where the copy sheet feeding roller is spaced below the moistening roller and the pressure roller is spaced below the drum, and means connecting the brackets to the lever means operable to move the brackets downward when the pressure roller and feeding roller are raised, said last named means including springs suspended from the brackets, and means connecting the lower ends of the springs to said lever means.

6. In a duplicating machine, a supporting frame, a drum mounted in the frame having means to mount a master sheet, a pressure roller for pressing sheets against the drums, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, manually operable lever means supporting the pressure roller and copy sheet feeding roller for movement up and down between a position where the pressure roller engages the drum and the feeding roller engages and carries the moistening roller, and a position where the copy sheet feeding roller is spaced below the moistening roller and the pressure roller is spaced below the drum, springs secured to said brackets and extending downwardly, levers pivoted on the frame and connected to the lower ends of said springs and links connecting the levers to said lever means, operable to turn the levers and apply a downward pull on the springs when the pressure and feeding rollers are raised.

7. In a duplicating machine, a supporting frame, a drum mounted in the frame having means to mount a master sheet, a pressure roller for pressing sheets against the drums, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, two lever arms pivoted in the frame, each arm supporting one end of the pressure roller and one end of the feeding roller, bearings journalled on the ends of said rollers and said arms having depressions in the top surfaces removably receiving the bearings, each of said rollers having its shaft extending from one end thereof beyond the bearing thereon, a drive wheel on each extended shaft, a third wheel adapted to engage both drive wheels, an arm pivoted on the adjacent lever arm and carrying said third wheel, a cam on the drum, a cam roller on said pivoted arm engaging the cam, and spring means interposed between said pivoted arm and the lever arm which carries it for pressing the third wheel toward the drive wheels.

8. In a duplicating machine, a supporting frame, a drum mounted in the frame having means to mount a master sheet, a pressure roller for pressing sheets against the drum, a copy sheet feeding roller, a copy sheet moistening roller suspended above and cooperating with said feeding roller to moisten a copy sheet as it is advanced on the feeding roller, a transfer roller resting on the moistening roller for distributing a copy sheet moistening fluid thereon, vertically movable brackets confining the transfer roller on the moistening roller, two lever arms pivoted in the frame, each arm supporting one end of the pressure roller and one end of the feeding roller, bearings journalled on the ends of said rollers and said arms having depressions in the top surfaces removably receiving the bearings, each of said rollers having its shaft extending from one end thereof beyond the bearing thereon, a drive wheel on each extended shaft, a third wheel adapted to engage both drive wheels, an arm pivoted on the adjacent lever arm and carrying said third wheel, a cam on the drum, a cam roller on said pivoted arm engaging the cam, and spring means interposed between said pivoted arm and the lever arm which carries it for pressing the third wheel toward the drive wheels, said lever arms being manually movable to separate the rollers thereon from the drum and the moistening roller, and means to prevent the pivoted arm from lifting the roller bearings out of their depressions in the lever arm that carries the pivoted arm when the rollers are separated from the drum and the moistening roller respectively.

9. In a duplicating machine, a supporting frame, a drum mounted in the frame having means to mount a master sheet, a pressure roller for pressing sheets against the drum, lever means supporting the pressure roller and pivotally supported by the frame to swing the roller into and out of pressure contact with the drum, a liquid trough adjacent to the drum, a roller rotatably supported therein, a copy sheet moistening roller adjacent to the trough, brackets carrying the moistening roller and movably mounted on the trough, a transfer roller resting on the two last named rollers, a copy sheet feeding roller carried by said lever means and movable thereby between a position spaced from the moistening roller when the pressure roller is separated from the drum, and a position where it engages and lifts the moistening roller when the pressure roller engages the drum, confining brackets for the transfer roller movably mounted at the ends of said trough for vertical movement, springs suspended from said brackets, means connecting the springs with said lever means operable to tension the springs when the lever means is positioned to engage the pressure roller with the drum, and operable to relieve the tension of said springs when the lever means is positioned to separate the pressure roller from a drum, driving wheels on the pressure roller and the copy sheet feeding roller, a third wheel carried by said lever means, spring means urging the third wheel into engagement with both of said first named wheels, means on the drum for holding the third wheel away from the other wheels except for a small portion of each rotation of the drum, said last named means comprising a circular cam plate pivotally mounted on the drum, an arm carrying the third wheel and pivoted on said lever means and having a roller riding on said plate, the plate having a flat edge portion, a threaded block pivoted to the plate, and a screw threaded into the block and having its head mounted on the drum periphery for turning the plate on the drum.

10. In a duplicating machine, a supporting frame, a drum mounted in the frame having means thereon to mount a master sheet, a moistening roller suspended in said frame adjacent to the drum, a pressure roller beneath the drum, a copy sheet feeding roller beneath the moistening roller, lever arms supporting the pressure roller and feeding roller and pivoted to the frame, the pressure roller and feeding roller having bearings journalled on the ends thereof and the lever arms having depressions receiving said bearings to mount the rollers, manually operable means to raise and lower the lever arms to bring the pressure roller and feeding roller into and out of pressure engagement with the drum and moistening roller respectively, and means engaging said moistening roller and operatively connected with said lever arms for downward movement in response to upward movement of said lever arms to apply downward pressure on the moistening roller when the feeding roller is moved up.

11. In a duplicating machine, a supporting frame, a drum mounted in the frame having means thereon to mount a master sheet, a moistening roller suspended in said frame adjacent to the drum, a pressure roller beneath the drum, a copy sheet feeding roller beneath the moistening roller, lever arms supporting the pressure roller and feeding roller and pivoted to the frame at the ends of the drum, the pressure roller and feeding roller having bearings journalled on the ends thereof and the lever arms having depressions receiving said bearings to mount the rollers, manually operable means to raise and lower the lever arms to bring the pressure roller and feeding roller into and out of pressure engagement with the drum and moistening roller respectively, and means connected with said lever arms, operable by raising the lever arms to apply downward pressure on the moistening roller when the feeding roller is moved up, said pressure roller and said feeding roller each having a drive wheel at one end thereof, an arm pivoted on the lever arm at said end of the rollers, a third wheel on said pivoted arm, spring means means urging the pivoted arm upward, the third wheel lying between said drive wheels and engaged therewith under the pressure of said spring means, and latch means preventing the third wheel from lifting the pressure roller and feeding roller out of the respective depressions in the lever arm at the drive wheel end thereof, when the lever arms are lowered.

12. In a duplicating machine, a supporting frame, a drum mounted in the frame having means thereon to mount a master sheet, a moistening roller suspended in said frame adjacent to the drum, a pressure roller beneath the drum, a copy sheet feeding roller beneath the moistening roller, lever arms supporting the pressure roller and feeding roller and pivoted to the frame at the ends of the drum, the pressure roller and feeding roller having bearings journalled on the ends thereof and the lever arms having depressions receiving said bearings to mount the rollers, manually operable means to raise and lower the lever arms to bring the pressure roller and feeding roller into and out of pressure engagement with the drum and moistening roller respectively, and means connected with said lever arms, operable by raising the lever arms to apply downward pressure on the moistening roller when the feeding roller is moved up, said pressure roller and said feeding roller each having a drive wheel at one end thereof, an arm pivoted on the lever arm at said end of the rollers, a third wheel on said pivoted arm, spring means urging the pivoted arm upward, the third wheel lying between said drive wheels and engaged therewith under the pressure of said spring means, a cam roller on the pivoted arm, a circular cam on the drum engaging the roller to hold the third wheel away from the drive wheels, said cam having a portion of its circular periphery cut away to allow the third wheel to engage the drive wheels for a limited portion of each rotation of the drum, and latch means preventing the third wheel from lifting the pressure roller and feeding roller out of the respective depressions in the lever arm at the drive wheel end thereof, when the lever arms are lowered.

13. In a duplicating machine, a supporting frame, a drum mounted in the frame having means thereon to mount a master sheet, a moistening roller suspended for up and down movement in said frame adjacent to said drum, a pressure roller beneath the drum, a copy sheet feeding roller beneath the moistening roller, two lever arms pivoted to the frame, one arm supporting one end of the pressure roller and one end of the feeding roller and the other arm supporting the other end of the pressure roller and the other end of the feeding roller, means to raise and lower the lever arms to bring the pressure roller and the feeding roller into and out of pressure engagement with the drum and the moistening roller respectively, means bearing downward on the moistening roller to oppose upward movement of said moistening roller by the feeding roller, and yieldable connections between said lever arms and said last named means operable upon upward movement of the pressure roller into engagement with the drum, to urge said means downward.

References Cited in the file of this patent
UNITED STATES PATENTS

| | | |
|---|---|---|
| 1,788,782 | Thatcher | Jan. 13, 1931 |
| 2,220,255 | Marchev et al. | Nov. 5, 1940 |
| 2,231,639 | Ritzerfeld | Feb. 11, 1941 |
| 2,335,954 | Neal | Dec. 7, 1943 |
| 2,573,810 | Rundblad | Nov. 6, 1951 |